(12) United States Patent
Hayashi et al.

(10) Patent No.: US 7,450,305 B2
(45) Date of Patent: Nov. 11, 2008

(54) POLARIZING PLATE AND LIQUID CRYSTAL DISPLAY DEVICE USING THE SAME

(75) Inventors: Narutoshi Hayashi, Niihama (JP); Hideki Hayashi, Niihama (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/758,119

(22) Filed: Jan. 16, 2004

(65) Prior Publication Data

US 2004/0156104 A1  Aug. 12, 2004

Related U.S. Application Data

(63) Continuation of application No. 10/062,437, filed on Feb. 5, 2002, now Pat. No. 6,965,473.

(30) Foreign Application Priority Data

Feb. 7, 2001 (JP) .............................. 2001-030672

(51) Int. Cl.
*G02B 5/30* (2006.01)
(52) U.S. Cl. ...................... 359/491; 359/483; 359/490; 264/1.34
(58) Field of Classification Search ................ 359/483, 359/485, 487, 490, 491, 492; 264/1.31, 1.34, 264/1.35; 349/96, 194; 252/585
See application file for complete search history.

(56) References Cited

U.S. PATENT DOCUMENTS

| 3,914,016 | A | 10/1975 | Dreyer |
| 5,656,751 | A | 8/1997 | Tanaka et al. |
| 5,706,131 | A | 1/1998 | Ichimura et al. |
| 5,739,296 | A | 4/1998 | Gvon et al. |
| 6,049,428 | A | 4/2000 | Khan et al. |
| 6,124,907 | A | 9/2000 | Jones et al. |
| 6,563,640 | B1 | 5/2003 | Ignatov et al. |
| 6,686,980 | B1 | 2/2004 | Ichihashi |
| 6,965,473 | B2 * | 11/2005 | Hayashi et al. ............ 359/491 |

FOREIGN PATENT DOCUMENTS

JP           3-54506 A       3/1991

(Continued)

OTHER PUBLICATIONS

Dreyer, Light Polarization From Films of Lyotropic Nematic Liquid Crystals, Journal De Physic Colloque C4, supplement au No. 11-12, Tome 30, Nov.-Dec. 1969, p. C4-114.

*Primary Examiner*—Arnel C Lavarias
(74) *Attorney, Agent, or Firm*—Sughrue Mion, PLLC

(57) ABSTRACT

A polarizing plate including a polarizing layer having a thickness of about 20 nm to about 1500 nm formed by rubbing at least one surface of a substrate, coating the rubbed surface of the substrate with an aqueous solution containing a dye having a tabular molecular shape, and drying the solution. This polarizing plate is a thinner polarizing plate with a high degree of polarization and suitably applicable to portable electronic equipment such as cellular phones, portable information terminals, smart cards and IC cards.

6 Claims, 2 Drawing Sheets

FOREIGN PATENT DOCUMENTS

| | | |
|---|---|---|
| JP | 03-058004 A | 3/1991 |
| JP | 6-287461 A | 10/1994 |
| JP | 8-511109 A | 11/1996 |
| JP | 9-197125 A | 7/1997 |
| JP | 2001-154022 | 6/2001 |
| WO | WO 94/28073 | 12/1994 |
| WO | WO 96/07941 A1 | 3/1996 |
| WO | WO 00/25155 A1 | 5/2000 |

* cited by examiner

POLARIZING PLATE AND LIQUID CRYSTAL DISPLAY DEVICE USING THE SAME

This is a continuation of application Ser. No. 10/062,437 filed Feb. 5, 2002; now U.S. Pat. No. 6,965,473 the disclosure of which is incorporated herein by reference.

BACKGROUND OF THE INVENTION

1. Field of the Invention

The present invention relates to a polarizing plate, a polarizing plate having a reflecting layer and a polarizing layer, and a liquid crystal display device using such a polarizing plate.

2. Description of the Related Art

Liquid crystal display devices have found applications in various fields including not only notebook type personal computers, word processors and monitors of desktop type personal computers, calculator, watch, but also liquid crystal projectors, liquid crystal TV sets, digital cameras, electronic notebooks, personal digital assistances, amusement equipment, stationery equipment, cellular phones, car navigation systems, and household electrical appliances such as rice cookers, air conditioners and microwave ovens.

With this widespread use of liquid crystal display devices, a variety of requirements have been made for polarizing plates as a requisite component for the liquid crystal display devices.

As a polarizing plate, generally known is one constructed of an iodine-based polarizing film or a dye-based polarizing film made by adsorbing iodine or a dichroic direct dye to a polyvinyl alcohol resin film in an oriented manner, with transparent protection films such as triacetyl cellulose films laminated to both sides of the polarizing film. The thickness is about 6 μm to about 30 μm for the polarizing film made of a polyvinyl alcohol resin, and is totally about 100 μm to about 190 μm including the transparent protection films. This polarizing film is produced by uniaxially stretching a polyvinyl alcohol resin film, adsorbing iodine or a dichromatic direct dye having an azo group to the film in an oriented manner, and soaking the resultant film in an aqueous solution containing boric acid.

Demand for lighter and thinner devices has been made for portable liquid crystal display devices such as cellular phones, electronic dictionary and personal digital assistances. With this demand, thinner polarizing plates have been required.

Reflective polarizing plates and semi-transmission reflective polarizing plates are often used for portable liquid crystal display devices. As reflecting plates or semi-transmission reflecting plates used for reflective polarizing plates and semi-transmission reflective polarizing plates, often used are scattering-type reflecting plates or semi-transmission reflecting plates constructed of a matted film having a thickness of about 50 μm with aluminum or silver deposited to one side of the film, and mirror-reflection reflecting plates or semi-transmission reflecting plates combined with a light diffusion layer. However, reflective polarizing plates including such reflecting plates are thick and for this reason easy to cause parallax. Thinner reflective polarizing plates are therefore requested.

As a thin polarizing plate, a polarizing plate having a polarizing layer formed by coating a solution containing a dye to a substrate has been known. For example, Japanese Laid-Open Patent Publication No. 3-54506 (JP 3-54506 A) discloses a polarizing plate having a polarizing layer formed by rubbing and then corona-treating a substrate and coating the treated surface of the substrate with a dichromatic dye having a rod molecular shape to arrange the dye molecules on the substrate in the coating direction. This polarizing plate, however, failed to be commercialized because the polarizing performance was insufficient. U.S. Pat. No. 6,049,428 discloses a polarizing plate improved in polarizing performance from the conventional coating-type polarizing plate. This polarizing plate is formed by coating a solution containing a dye to a substrate, which solution is prepared by introducing at least one hydrophilic groups to the dye having a tabular molecular shape and solving the resultant dye to water. However, the polarizing performance of this polarizing plate is still insufficient. Further improvement in transmittance and contrast is therefore requested.

SUMMARY OF THE INVENTION

An object of the present invention is to provide a polarizing plate excellent in contrast, thinned and improved in degree of polarization by using a polarizing layer obtained as a coating of an aqueous solution containing a dye having a tabular molecular shape. Another object of the present invention is to provide a reflective polarizing plate or a semi-transmission reflective polarizing plate having an above mentioned reflection layer and a polarizing layer, which can be thinner than the conventional devices.

To attain the above objects, the inventors of the present invention have earnestly examined and found that a thin polarizing plate having satisfactory polarizing performance can be obtained by coating a rubbed surface of a substrate with an aqueous solution containing a dye having a tabular molecular shape. The present invention has been realized based on the above findings.

That is, the present invention is to provide a polarizing plate comprising a polarizing layer having a thickness of 20 nm to 1500 nm formed by rubbing at least one surface of a substrate, coating the rubbed surface of the substrate with an aqueous solution containing a dye having a tabular molecular shape, and drying the solution.

In another aspect, a reflective polarizing plate is provided, in which a reflection layer is formed on one surface of a substrate and an above mentioned polarizing layer having a thickness of about 20 nm to about 1500 nm is formed on at least one surface of the substrate. The reflective polarizing plate may also include a light diffusion layer on the polarizing layer. The reflective polarizing plate can be placed on a liquid crystal cell with the polarizing layer being positioned closer to the liquid crystal cell, to attain a reflective or semi-transmission reflective liquid crystal display device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not limitative of the present invention and wherein.

DETAILED DESCRIPTION OF THE PREFERRED EMBODIMENTS

Figure 1:
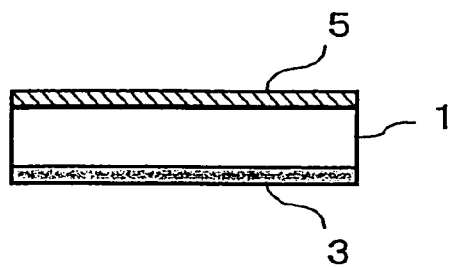
FIG. 1 is a schematic cross-sectional view of an example of layer configuration of a polarizing plate having a reflecting layer of the present invention.

Hereinafter, the present invention will be described in detail.

According to the present invention, a transparent resin film is generally used as a substrate for forming a polarizing layer. Examples of such a transparent resin film include cellulose films, polyester films, polyolefin films, acrylic films, polycarbonate films, polyarylate film and polyether sulfone films. To be more specific, as cellulose films, cellulose acetate films are preferred, including a cellulose triacetate film and a cellulose diacetate film, for example. Polyester films include a polyethylene terephthalate film, a polyethylene naphthalate film and a polybutylene terephthalate film, for example. As polyolefin films, amorphous ones are preferred. In particular, preferred are those having cyclic olefin polymerization units such as norbornene and polycyclic norbornene monomers. Copolymers of cyclic olefin and chain olefin may be used. Among others, films made of norbornene resins can be used advantageously. Ones having a polar group are also effective. A glass plate or a metal plate may also be used in place of the resin film.

The substrate is preferably as thin as possible, but, if it is excessively thin, the workability degrades. Therefore, the thickness of the substrate may be about 10 µm to about 150 µm, preferably about 20 µm to about 100 µm, more preferably about 30 µm to about 90 µm. The substrate may contain a UV absorber and the like. As such a substrate, a commercially available product may be used. Examples of commercially available triacetyl cellulose films include "KONICA® UV80SF" from Konica Corp. and "FUJITAC®" from Fiji Photo Film Co., Ltd. Examples of commercially available amorphous polyolefin rein films include "S-SINA®" and "SCA40" from Sekisui Chemical Co., Ltd., "ARTON®" from JSR Corp., "ZEONEX®" and "ZEONOR®" from Nippon Zeon Co., Ltd., and "APO®" and "APEL®" from Mitsui Chemicals, Inc. The substrate is preferably non-oriented and has an inplain retardation value of about 100 nm or less, more preferably about 50 nm or less. Note that this value is not applied when a resin film having a phase retardation property is used as the substrate. Viewing angle enlarged films, such as "FUJI WVA FILM" from Fuji Photo Film Co., Ltd. and "LC FILM" and "NH FILM" from Nippon petrochemicals Co., Ltd., can also be used as the substrate although they have a birefringence property. "DBEF", "TDF" and "DRF" from 3M, can also be used as the substrate.

According to the present invention, at least one surface of the substrate described above is coated with an aqueous solution containing a dye having a tabular molecular shape to form a polarizing layer. Prior to this coating, the surface of the transparent substrate to be coated is subjected to rubbing. It is presumed that some orientation is provided on the surface of the substrate by this rubbing and this causes the dye having a tabular molecular shape in an aqueous solution applied to the surface to be oriented roughly in one direction. In the polarizing plate of the present invention, the dye having a tabular molecular shape is oriented roughly perpendicular to the rubbing direction. The direction of orientation of the dye molecules in the present polarizing layer unexpectedly differs from that in the known polarizing layer as disclosed in JP 3-54506 A, in which the direction of orientation of the dye molecules corresponds to rubbing direction.

The surface of the substrate can be rubbed with a velvet cloth or the like, for example. The cloth used for the rubbing may be made of rayon, cupra, nylon, cotton, or felt, for example. The cloth may be wound around a roll and rotated for rubbing, or the cloth may be fixed while the substrate is moved for rubbing. The rubbing is performed in a constant direction on the surface of the substrate, and must be performed at least once. The surface may be rubbed several times, and even be rubbed in a reciprocating manner in constant directions. When a long size substrate is rubbed, it is preferable that rubbing is conducted by pressing the cloth to the substrate. Though the traveling directions of the roll and the substrate may be same or reverse each to other in the case of using the cloth wound around a roll, the same direction is preferable because uniform rubbing can be easily carried.

The thus-rubbed surface of the substrate is coated with an aqueous solution containing a dye having a tabular molecular shape to form a polarizing layer. Examples of such dyes include an anthraquinone type dye, a phthalocyanine type dye, a porphyrin type dye, a naphthalocyanine type dye, a quinacridone type dye, a dioxadin type dye, an indanthrene type dye, an acridine type dye, a perylene type dye, a pyrazolone type dye, an acridone type dye, a pyranthrone type dye and an isoviolanthrone type dye.

They are dyes having a tabular molecule shape like a disk, represented by the following structural formula, for example.

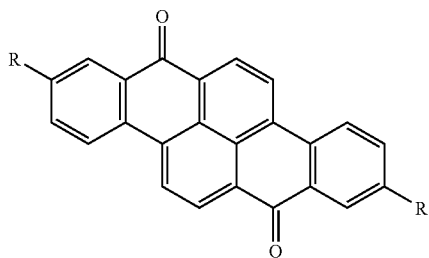

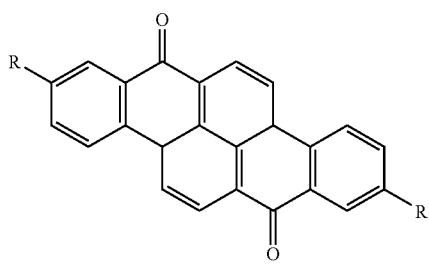

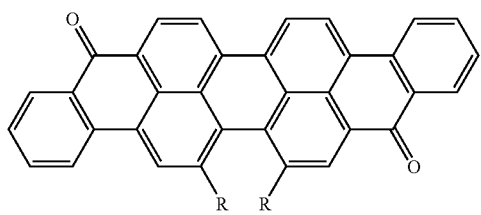

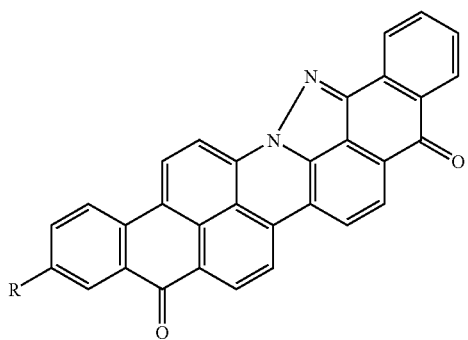

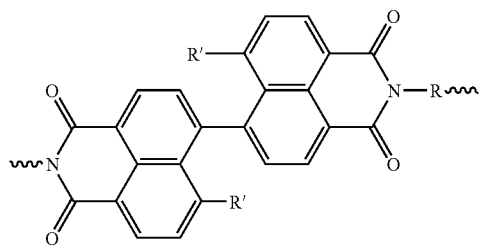

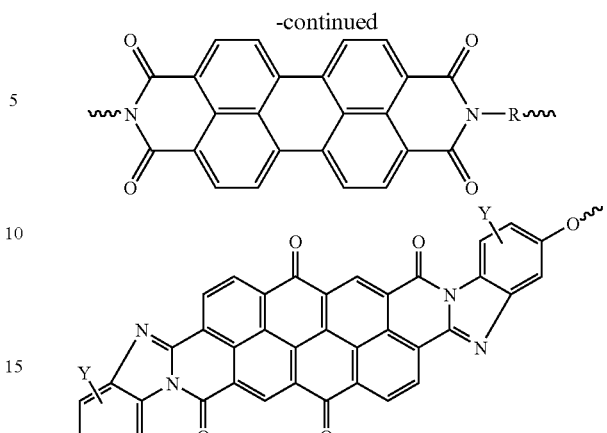

wherein R, R' and Y represent substituents.

The dyes having a tabular molecular shape suitably usable for the present invention are disclosed in U.S. Pat. No. 5,739,296.

In the present invention, an aqueous solution containing a dye is prepared by introducing one or a plurality of hydrophilic groups such as sulfonic acid groups into the above dyes having a tabular molecular shape and dissolving the resultant dye to water. The dye introduced hydrophilic groups is amphipathic material exhibiting a lyotropic liquid crystal phase.

As an aqueous solution containing such a dye, one prepared by Optiva, Inc. in US may be used.

The aqueous solution containing a dye for coating preferably contains a surfactant in addition to the dye. Examples of the surfactant include polyethylene glycol and "TRITON® X-100" (a nonionic surfactant available from Rohm and Haas Co.).

Coating with the aqueous solution containing the dye can be performed by a normal method. For example, Meyer bar coating, gravure coating, dye coating, dip coating, screen-printing and printing techniques such as ink-jet printing may be used. Among them, a method providing shear stress to the aqueous solution is preferably used. After the coating, water as the solvent is evaporated to form the polarizing layer. Water can be evaporated by a normal drying method including heat drying, room temperature drying, freeze-drying and far-infrared drying. The thickness of the resultant polarizing layer is as thin as about 20 nm to about 1500 nm, preferably about 50 nm to about 1000 nm, which is properly selected depending on the type of the dye having a tabular molecular shape and the transmittance of the resultant polarizing plate.

The thus-obtained polarizing plate can be placed on one or both of the surfaces of a liquid crystal cell, as is the case in the conventional polarizing plate, to obtain a liquid crystal display device. The polarizing plate can be used as a front polarizing plate or a back polarizing plate for a liquid crystal cell. When the polarizing plate obtained according to the present invention is placed on a so-called plastic liquid crystal cell or film liquid crystal cell having two polymer films attached to each other to obtain a liquid crystal display device, the polarizing plate of the present invention may be bonded to the liquid crystal cell, or the polymer films constituting the liquid crystal cell themselves may be made of a member including a thin polarizing layer formed on a surface of a substrate according to the present invention.

Figure 2:
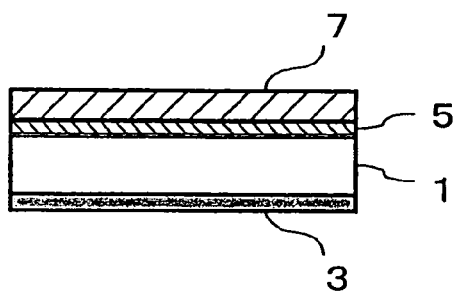
FIG. 2 is a schematic cross-sectional view of an example of layer configuration of the polarizing plate having a reflecting layer and a diffusing layer of the present invention.
Figure 3:
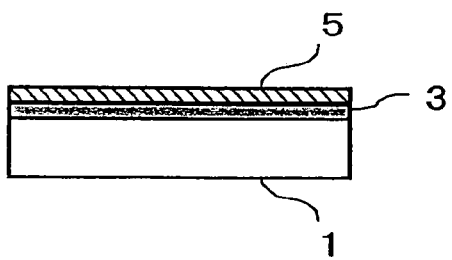
FIG. 3 is a schematic cross-sectional view of another example of layer configuration of the polarizing plate having a reflecting layer of the present invention.
Figure 4:
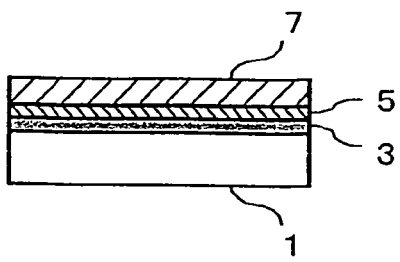
FIG. 4 is a schematic cross-sectional view of another example of layer configuration of the polarizing plate having a reflecting layer and a diffusing layer of the present invention.
Figure 5:
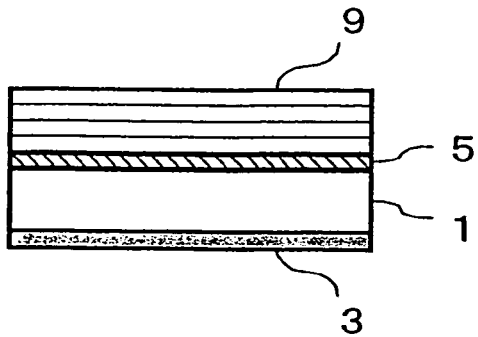
FIG. 5 is a schematic cross-sectional view of an example of lamination of the polarizing plate of FIG. 1 to a liquid crystal cell.
Figure 6:
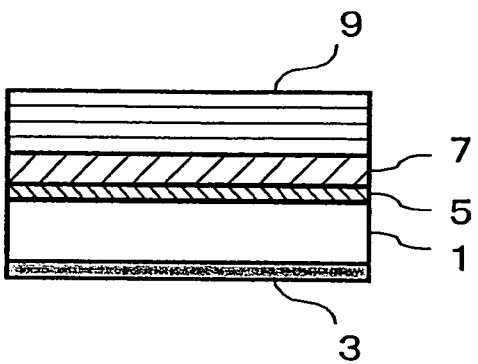
FIG. 6 is a schematic cross-sectional view of an example of lamination of the polarizing plate of FIG. 2 to a liquid crystal cell.
Figure 7:
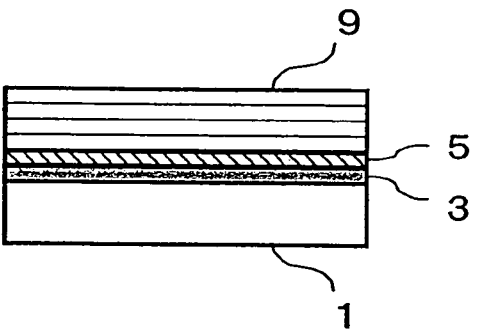
FIG. 7 is a schematic cross-sectional view of an example of lamination of the polarizing plate of FIG. 3 to a liquid crystal cell.
Figure 8:
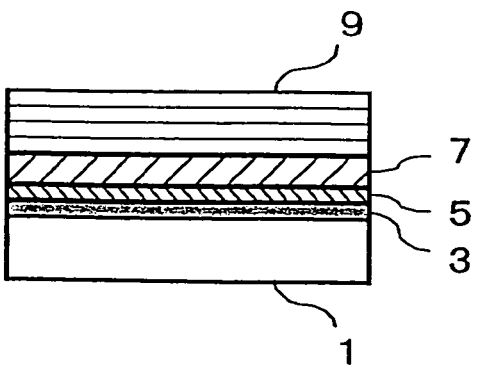
FIG. 8 is a schematic cross-sectional view of an example of lamination of the polarizing plate of FIG. 4 to a liquid crystal cell.

As shown in FIG. 1, the polarizing plate of the present invention may include a reflecting layer 3 on one surface of a substrate 1 and a polarizing layer 5 on the other surface of the substrate 1. A light diffusion layer 7 may also be provided on the surface of the polarizing layer 5 opposite to the substrate 1 as shown in FIG. 2. The substrate 1 may be a translucent or milky resin film. As another configuration of the polarizing plate of the present invention, the polarizing layer 5 may be directly formed on the reflecting layer 3 as shown in FIG. 3. The reflecting layer 3 is normally formed on a surface of the substrate 1. In this case, the reflecting layer is formed on a surface of the substrate, next, a surface of the resultant reflecting layer is rubbed and a polarizing layer is formed on the rubbed surface of the reflecting layer. A light diffusion layer 7 may also be provided on the surface of the polarizing layer 5 opposite to the surface thereof in contact with the reflection layer 3 as shown in FIG. 4.

The reflecting layer 3 is preferably constructed of a metal layer for good reflection of light. Such a metal layer can be provided with forming a layer made of a metal having high reflectivity, such as aluminum and silver. The metal layer may be formed by a normal method used for forming a metal thin film, including vacuum evaporation, sputtering and ion plating, for example. In general, the reflecting layer 3 having a thickness of about 10 nm to about 100 nm exhibits practically sufficient reflectivity. The reflecting layer 3 may be a semi-transmission reflecting layer provided with some degree of transmission. The thickness of the metal layer provided with transmission is normally about 10 nm to about 30 nm.

When a layer made of silver is formed as the metal layer by evaporation or the like, a protection layer is preferably formed on the top and/or bottom of the metal layer to prevent degradation of the metal layer. As the protection layer, there is no specific limitation, but coat films made of acrylic resins, epoxy resins, polyester resins, urethane reins, alkyd resins and the like may be preferably used, for example. Such protection coat films can be formed by a normal method including roll coating, gravure coating and spraying. A thin film made of an inorganic matter such as aluminum oxide and silicon oxide may also be used as the protection layer. The protection layer normally has a thickness of about 5 μm to about 20 μm, if provided.

The reflection surface of the reflecting layer 3, that is, the interface with the substrate 1 may be roughened. For example, the surface can be roughened by a method of sandblasting the surface of the substrate 1 before formation of the reflecting layer 3 or a method of coating the surface of the substrate 1 with a coat solution containing inorganic particulates or organic particulates. Alternatively, a resin film made by flattening a resin with inorganic fillers mixed therein by extrusion or the like may be used as the substrate because the surface of the resin film is rough.

When the reflection surface of the reflecting layer 3 is a flat mirror surface, the light diffusion layer 7, made of a resin with inorganic particulates and/or organic particulates mixed therein, may be provided on the polarizing layer 5 as shown in FIG. 2. Examples of the inorganic particulates used in this case include not only particulates of silica, calcium carbide and the like, but also iridescent particulates of pearl pigments such as synthetic or natural mica coated with titanium dioxide, tabular fish scale foils, and hexagonal plate basic lead carbonate and the like. Examples of the organic particulates include acrylic beads such as polymethyl methacrylate beads, polystyrene beads such as cross-linked polystyrene beads, polycarbonate beads, melamine-formaldehyde resin beads, benzoguanamine-formaldehyde resin beads and organic silica beads. The particle size of the particulates is not specifically limited, but may be about 0.1 μm to about 50 μm, preferably about 1 μm to about 20 μm, more preferably about 1 μm to about 10 μm. The above particulates may be used alone or in combination of two or more types. The resin for the light diffusion layer 7 is not specifically limited, but may be any of acrylic resins, urethane resins, epoxy resins, polyester resins, alkyd resins and the like. These resins may be a viscosity property. The combination of the particulates and the resin binder may be appropriately selected. Preferably, the combination is selected so that the difference in refractive index therebetween is about 0.01 to about 0.5. The mixture ratio of the particulates to the resin binder is not specifically limited, either, but in general, about 0.01 to about 70 parts by weight of the particulates are mixed in 100 parts by weight of the resin binder. When the light diffusion layer 7 is provided, the thickness of this layer is normally about 1 μm to about 100 μm, preferably about 5 μm to about 30 μm.

The light diffusion layer 7 can be formed by mixing the particulates in the resin and then applying the mixture by a normal method such as roll coating, gravure coating and straying, for example. Alternatively, the light diffusion layer 7 may be formed with laminating a film having a light diffusion property. Such a film having a light diffusion property can be obtained using the inorganic particulates and/or organic particulates and the resin described above. For example, it may be a film obtained by casting the resin with the particulates mixed therein, a film obtained by first coating a surface of a substrate film with the resin with the particulates mixed therein and then peeling off the resin from the substrate film, a film obtained by embossing the surface of any of the above films, or a film obtained by subjecting a mixture of resins different in refractive index to thermosetting or photo-curing. The resultant light diffusion film may have a haze value of about 5% to about 99%, for example. The way of laminating the film is not specifically limited. For example, the film may be laminated in a normal way using an acrylic adhesive or the like.

The thus-obtained reflective polarizing plate can be laminated on the back surface of a liquid crystal cell (surface opposite to that on the viewer's side) to obtain a liquid crystal display device. In this placement, the reflective polarizing plate is positioned so that the polarizing layer is closer to the liquid crystal cell as shown in FIG. 5 to FIG. 8. A phase retardation plate may be interposed between the polarizing layer 5 or the light diffusion layer 7 and the liquid crystal cell 9 as required. Another polarizing plate (not shown) may be placed on the front surface of the liquid crystal cell 9 (surface opposite to that on which the reflective polarizing plate is placed). The front polarizing plate may be one including a normal polyvinyl alcohol polarizing plate, but may be a polarizing plate according to the present invention including a polarizing layer comprising the dye and having a thickness of 20 to 1500 nm formed on a substrate by coating, to attain further thinning of the polarizing plate. In the latter case, the polarizing layer is normally positioned as the outermost layer. A phase retardation plate may also be placed on the front side of the liquid crystal cell.

EXAMPLES

Hereinafter, the present invention will be described in more detail by way of examples. It should be noted that the present invention is not restricted by these examples.

Single transmittance $Ts(\lambda)$, parallel transmittance $Tp(\lambda)$ and crossed transmittance $Tc(\lambda)$ for an arbitrary wavelength were calculated using expressions (1), (2) and (3) below.

$$Ts(\lambda)=\{K(\lambda)+L(\lambda)\}/2 \quad (1)$$

$$Tp(\lambda)=\{K(\lambda)^2+L(\lambda)^2\}/2 \quad (2)$$

$$Tc(\lambda)=K(\lambda)\times L(\lambda) \quad (3)$$

wherein $K(\lambda)$ is the spectral transmittance obtained when linearly polarized light is applied in the direction of the transmission axis of the polarizing plate, $L(\lambda)$ is the spectral transmittance obtained when linearly polarized light is applied in the direction of the absorption axis of the polarizing plate.

Both $K(\lambda)$ and $L(\lambda)$ were measured with a spectrophotometer (Shimadzu UV-2200).

Luminosity corrected transmittance T (luminosity corrected single transmittance Ts, luminosity corrected parallel transmittance Tp, luminosity corrected cross transmittance Tc) was calculated from the spectral transmittance $\tau(\lambda)$ (Ts $(\lambda)$, Tp$(\lambda)$ Tc$(\lambda)$), which is measured every 10 nm in the wavelength range of 400 nm to 700 nm using expression (4) below.

$$T = \frac{\int_{400}^{700} P(\lambda)y(\lambda)\tau(\lambda)d\lambda}{\int_{400}^{700} P(\lambda)y(\lambda)d\lambda} \quad (4)$$

wherein $P(\lambda)$ is the spectral distribution of standard light (C illuminant) and $y(\lambda)$ is the two-degree-field color matching function.

The degree of polarization P was calculated from the luminosity corrected parallel transmittance Tp and the luminosity corrected cross transmittance Tc using expression (5) below.

$$P=\{(Tp-Tc)/(Tp+Tc)\}^{1/2} \quad (5)$$

Example 1

A surface of a polyethylene terephthalate film (obtained from Toray Industries, Inc.) having a thickness of about 75 μm was rubbed with a velvet cloth on a rubbing apparatus by five reciprocating motions of the cloth. An aqueous solution containing a dye having a tabular molecular shape ("LCP N013" obtained from Optiva, Inc.) was applied to the rubbed surface with No. 3 Meyer bar at an applying speed of 100 mm/sec, and then left to stand at room temperature (about 20° C.) for 30 minutes for drying. The thickness of the polarizing layer after drying was about 500 nm. The overall thickness of the obtained polarizing plate is 75.5 μm. The degree of polarization P of the resultant polarizing plate was 84.0% and the single transmittance Ts thereof was 41.2%, exhibiting good polarizing performance.

Comparative Example 1

A polarizing plate was produced in the same manner as that in Example 1 except that the surface of the polyethylene terephthalate film was not rubbed. The degree of polarization P of the resultant polarizing plate was 80.1% and the single transmittance Ts thereof was 40.8%.

Example 2

A polarizing plate was produced in the same manner as that in Example 1 except that the solution was applied with No. 5 Meyer bar at an applying speed of 200 mm/sec. The degree of polarization P of the resultant polarizing plate was 94.4% and the single transmittance Ts thereof was 36.0%, exhibiting good polarizing performance.

Comparative Example 2

A polarizing plate was produced in the same manner as that in Example 2 except that the surface of the polyethylene terephthalate film was not rubbed. The degree of polarization P of the resultant polarizing plate was 90.8% and the single transmittance Ts thereof was 36.3%.

Example 3

A surface of a norbornene resin film "SCA50" (obtained from Sekisui Chemical Co., Ltd.) having a thickness of about 50 μm is rubbed with a velvet cloth on a rubbing apparatus by five reciprocating motions of the cloth. An aqueous solution containing a dye having a tabular molecular shape "LCP N0015" (obtained from Optiva, Inc.) is applied to the rubbed surface with No. 5 Meyer bar coater at an applying speed of 50 mm/sec, and then left to stand at room temperature (about 20° C.) for 30 minutes for drying to obtain a polarizing plate. The thickness of the thus-obtained polarizing layer is about 1000 nm. Aluminum is evaporated onto the surface of the polarizing layer-formed film opposite to the surface on which the polarizing layer is formed, forming a reflecting layer having a thickness of about 60 nm. As a result, a thinner reflective polarizing plate having a thickness of about 51 μm is obtained.

A diffusion type adhesive is applied to the surface of the polarizing layer of the reflective polarizing plate, and the polarizing plate is bonded to the bottom surface of a TN liquid crystal cell via the adhesive. A polarizing plate comprising polyvinyl alcohol and iodine ("SQ1852A" obtained from Sumitomo Chemical Co., Ltd.) is bonded to the top surface of the TN liquid crystal cell via an adhesive, to complete a TN liquid crystal display device. This TN liquid crystal display device can be thinned, and is small in parallax providing easy view.

Comparative Example 3

A TN liquid crystal display device was manufactured in the same manner as that in Example 3 except that a lamination (thickness: about 255 μm) of a polarizing plate comprising polyvinyl alcohol and iodine ("SQ12852A" obtained from Sumitomo Chemical Co., Ltd.), and a reflecting plate comprising silver was used as the polarizing plate bonded to the bottom surface of the TN liquid crystal cell. The resultant TN liquid crystal display device was large in parallax and thus difficult to be viewed.

Thus, according to the present invention, a thinner polarizing plate with a high degree of polarization is attained. Therefore, the polarizing plate of the present invention is suitably applicable to portable electronic equipment such as cellular phones, portable information terminals, smart cards and IC cards.

The invention being thus described, it will be obvious that the same may be varied in many ways. Such variations are not to be regarded as a departure from the spirit and scope of the invention, and such modifications as would be obvious to one skilled in the art are intended to be included within the scope of the following claims.

What is claimed is:

1. A polarizing plate comprising a polarizing layer having a thickness of about 20 nm to about 1500 nm formed by rubbing at least one surface of a substrate, coating the rubbed surface of the substrate with an aqueous solution containing a dye having a tabular molecular shape, and drying the solution, wherein the dye having a tabular molecular shape coated on the rubbed surface of the substrate is oriented roughly perpendicular to the rubbing direction, wherein the aqueous solution containing a dye is prepared by introducing at least one hydrophilic groups to the dye and solving the resultant dye to water.

2. The polarizing plate according to claim 1, wherein the dye is at least one dyes selected from the group consisting of an anthraquinone type dye, a phthalocyanine type dye, a porphyrin type dye, a naphthalocyanine type dye, a quinacridone type dye, a dioxadin type dye, an indanthrene type dye, an acridine type dye, a perylene type dye, a pyrazolone type dye, an acridone type dye, a pyranthrone type dye and an isoviolanthrone type dye.

3. The polarizing plate according to claim 1, wherein the substrate is a polyester resin film.

4. A liquid crystal display device comprising the polarizing plate according to claim 1 laminated on a liquid crystal cell with the polarizing layer being positioned closer to the liquid crystal cell.

5. The liquid crystal display device according to claim 4, wherein a front polarizing plate is placed on a surface of the liquid crystal cell opposite to the surface on which the polarizing plate is laminated.

6. The liquid crystal display device according to claim 5, wherein the front polarizing plate is the same as the polarizing plate placed opposite to the liquid crystal cell.

* * * * *